United States Patent
Masuda et al.

(10) Patent No.: US 10,991,478 B2
(45) Date of Patent: Apr. 27, 2021

(54) INSULATED WIRE

(71) Applicant: DAIKIN INDUSTRIES, LTD., Osaka (JP)

(72) Inventors: Haruhisa Masuda, Settsu (JP); Yuki Ueda, Settsu (JP); Masami Nishiumi, Settsu (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 0 days.

(21) Appl. No.: 14/760,562

(22) PCT Filed: Jan. 7, 2014

(86) PCT No.: PCT/JP2014/050069
§ 371 (c)(1),
(2) Date: Jul. 13, 2015

(87) PCT Pub. No.: WO2014/112405
PCT Pub. Date: Jul. 24, 2014

(65) Prior Publication Data
US 2015/0357084 A1 Dec. 10, 2015

(30) Foreign Application Priority Data
Jan. 17, 2013 (JP) .............................. JP2013-006416

(51) Int. Cl.
| *H01B 3/30* | (2006.01) |
| *H01B 3/44* | (2006.01) |
| *H01B 3/42* | (2006.01) |
| *H01B 7/29* | (2006.01) |
| *C08G 73/10* | (2006.01) |
| *C08L 79/08* | (2006.01) |
| *C08G 73/14* | (2006.01) |

(52) U.S. Cl.
CPC ......... *H01B 3/445* (2013.01); *C08G 73/1046* (2013.01); *C08G 73/14* (2013.01); *C08L 79/08* (2013.01); *H01B 3/301* (2013.01); *H01B 3/306* (2013.01); *H01B 3/427* (2013.01); *H01B 7/292* (2013.01); *Y10T 428/294* (2015.01)

(58) Field of Classification Search
CPC ........ H01B 3/445; H01B 3/101; H01B 3/427; H01B 7/292; Y10T 428/294
USPC .......................... 174/110 R, 110 FC; 428/379
See application file for complete search history.

(56) References Cited

U.S. PATENT DOCUMENTS

| 4,362,069 A * | 12/1982 | Giatras | D07B 1/162 264/122 |
| 6,600,108 B1 * | 7/2003 | Mydur | H01B 7/046 174/120 R |
| 7,288,721 B2 * | 10/2007 | Varkey | H01B 7/0291 174/102 R |
| 2005/0161856 A1 * | 7/2005 | Globus | C09D 127/18 264/171.14 |
| 2011/0192632 A1 * | 8/2011 | Abe | H01B 3/301 174/120 SR |
| 2013/0109810 A1 * | 5/2013 | Xie | C08L 27/18 525/153 |

FOREIGN PATENT DOCUMENTS

| EP | 2 767 986 A1 | 8/2014 |
| EP | 2 818 516 A1 | 12/2014 |
| EP | 2 881 430 A1 | 6/2015 |
| JP | 05-225832 A | 9/1993 |
| JP | 06-215635 A | 8/1994 |
| JP | 08-017258 A | 1/1996 |
| JP | 2010-067521 A | 3/2010 |
| JP | 2010-123389 A | 6/2010 |
| JP | 2011-159578 A | 8/2011 |
| JP | 2011-165485 A | 8/2011 |
| JP | 2012-243568 A | 12/2012 |
| WO | 2011/024809 A1 | 3/2011 |
| WO | WO-2012005133 A1 * | 1/2012 ............ C08L 27/18 |

OTHER PUBLICATIONS

Communication dated Jul. 20, 2016 from the European Patent Office in counterpart Application No. 14740261.4.
International Preliminary Report on Patentability dated Jul. 21, 2015, issued by the International Bureau of WIPO in counterpart International Application No. PCT/JP2014/050069.
International Search Report for PCT/JP2014/050069 dated Feb. 10, 2014.
Wang, Ian et al., Polymer Material, Jan. 2009, ISBN 978-7-75019-5654-7 (5 pages total).

* cited by examiner

*Primary Examiner* — Matthew D Matzek
(74) *Attorney, Agent, or Firm* — Sughrue Mion, PLLC

(57) ABSTRACT

An object of the present invention is to provide an insulated wire which includes an insulating layer with a low relative permittivity and has excellent heat resistance and excellent abrasion resistance. The insulated wire of the present invention includes a conductor (A), and an insulating layer (B) formed on the periphery of the conductor (A), the insulating layer (B) is formed from a resin composition that contains a resin (I) with a relative permittivity of 3.0 to 4.0 and a fluororesin (II).

3 Claims, No Drawings

ID # 1
INSULATED WIRE

TECHNICAL FIELD

The present invention relates to an insulated wire.

BACKGROUND ART

Electric wires used for automobiles or robots, and winding wires for coils used for motors are required to have excellent insulation. In recent years, an increase in the voltage and the current has accelerated, but this is likely to cause partial discharge. In order to prevent deterioration of insulating layers due to partial discharge, electric wires and coils including an insulating layer with a low relative permittivity have been demanded. Also, winding wires for motor coils mounted in automobiles have been desired to have high heat resistance and excellent abrasion resistance.

In the context of these demands, various studies have been made to improve the characteristics of the electric wires. For example, electric wires including an insulating layer formed from at least two kinds of resin have been suggested as described below.

Patent Literature 1, for example, suggests an insulated wire including a thin insulation-coated layer which is formed from a resin mixture of 90 to 50 wt % polyetheretherketone resin and 10 to 50 wt % polyether imide resin and has a thickness of 0.2 mm or smaller.

Patent Literature 2 suggests resin-coated wires and cables each obtained by forming a fluororesin layer between a conductor and a polyetheretherketone resin-coating layer in a wire or a cable obtained by extrusion-coating the conductor with a polyetheretherketone resin.

Patent Literature 3 suggests an insulated wire including an insulating layer which is formed by applying a resin mixture of at least one kind of resin selected from polyamideimide resins, polyimide resins, polyester imide resins, and class H polyester resins, and at least one kind of resin selected from fluororesins and polysulfone resins, and baking the resin mixture.

Patent Literature 4 suggests an insulated wire including a first coating layer in which a resin composition obtained by graft-polymerizing a grafting compound onto an ethylene-tetrafluoroethylene copolymer is formed directly on a conductor; and a second coating layer in which a resin composition, which is a polymer alloy of a polyphenylene sulfide resin and a polyamide resin, is formed directly on the first coating layer.

Patent Literature 5 suggests an insulated wire including an insulating layer which is formed from a polymer alloy of a polyether sulfonic resin and at least one kind of crystalline resin selected from polyphenylene sulfide resins and polyetheretherketone resins, and exhibits a weight ratio of the polyether sulfonic resin to the crystalline resin of from 50:50 to 90:10.

Patent Literature 6 suggests an insulated wire including a resin layer which is formed by applying a resin obtained from a polyamideimide or a polyester imide mixed with a polyphenylene ether at a ratio (by mass) of from 60:40 to 95:5, and baking the resin.

CITATION LIST

Patent Literature

Patent Literature 1: JP H5-225832 A
Patent Literature 2: JP H8-17258 A
Patent Literature 3: JP 2010-67521 A
Patent Literature 4: JP 2011-165485 A
Patent Literature 5: JP 2010-123389 A
Patent Literature 6: JP 2011-159578 A

SUMMARY OF INVENTION

Technical Problem

Still, the demands for miniaturization and high output power of instruments for automobiles and robots, and motors, have led to an increase in the density of current flowing in the electric wires and coils in the instruments and motors, and are likely to increase the density of winding wires. Accordingly, electric wires are desired to provide higher performance than conventional electric wires.

An object of the present invention is to provide an insulated wire which includes an insulating layer with a low relative permittivity and has excellent heat resistance and excellent abrasion resistance.

Solution to Problem

The present inventors have made intensive studies on insulated wires that include an insulating layer with a low relative permittivity and have excellent heat resistance and excellent abrasion resistance. As a result, the inventors have found that combination use of a specific resin and a fluororesin enables production of an insulated wire that includes an insulating layer with a low relative permittivity and has excellent heat resistance and excellent abrasion resistance. Thereby, the present invention has been completed.

That is, the present invention relates to an insulated wire including a conductor (A), and an insulating layer (B) formed on the periphery of the conductor (A), the insulating layer (B) is formed from a resin composition that contains a resin (I) with a relative permittivity of 3.0 to 4.0 and a fluororesin (II).

The fluororesin (II) is preferably a copolymer of tetrafluoroethylene and a perfluoroethylenic unsaturated compound represented by the following formula (1):

$$CF_2=CF-Rf^1 \qquad (1)$$

wherein $Rf^1$ represents $-CF_3$ or $-ORf^2$, and $Rf^2$ represents a C1-C5 perfluoroalkyl group. The fluororesin (II) is more preferably a copolymer of tetrafluoroethylene and at least one perfluoro monomer selected from the group consisting of perfluoro(alkyl vinyl ethers) and hexafluoropropylene.

The resin (I) is preferably at least one kind selected from the group consisting of polyimides, polyamideimides, polyetherimides, polyarylene sulfides, polyarylates, polysulfones, polyethersulfones, and liquid crystal polymers. The resin (I) is more preferably a polyarylene sulfide.

The insulating layer (B) preferably has a mass ratio (I):(II) of the resin (I) to the fluororesin (II) of 98:2 to 10:90.

Advantageous Effects of Invention

The insulated wire of the present invention having the above structure includes an insulating layer with a low relative permittivity and has excellent heat resistance and excellent abrasion resistance.

DESCRIPTION OF EMBODIMENTS

The present invention relates to an insulated wire including a conductor (A), and an insulating layer (B) formed on the periphery of the conductor (A), and the insulating layer (B) is formed from a resin composition that contains a resin (I) with a relative permittivity of 3.0 to 4.0 and a fluororesin (II).

With the above structure, the insulated wire of the present invention has excellent heat resistance and excellent abrasion resistance, and the insulating layer (B) thereof exhibits a low relative permittivity. Since the insulated wire of the present invention includes the insulating layer (B) with a low relative permittivity, partial discharge voltage can be increased.

The insulating layer (B) formed on the periphery of the conductor (A) may be in contact with the conductor (A), or may be formed on the conductor (A) with other layer(s) (e.g. other resin layer(s)) in between.

The insulating layer (B) is preferably in contact with the conductor (A), and in this case, the adhesion between the conductor (A) and the insulating layer (B) in the insulated wire is high.

The resin (I) has a relative permittivity of 3.0 to 4.0. A resin with a relative permittivity of 3.0 to 4.0 enables formation of the insulating layer (B) with a low relative permittivity. Also, the resin (I) gives excellent heat resistance and excellent abrasion resistance to the insulated wire. The resin (I) preferably has a relative permittivity of 3.8 or lower, and more preferably 3.6 or lower.

The relative permittivity of the resin (I) is a value obtained by measurement at 23° C. and a measurement frequency of 1 MHz. The measurement of the relative permittivity can be performed by the cavity perturbation method using a network analyzer.

The resin (I) preferably has a glass transition temperature of 70° C. or higher, more preferably 80° C. or higher, and still more preferably 90° C. or higher. The resin (I) having a glass transition temperature within the above range can improve the heat resistance of the resulting insulating layer (B). The resin (I) also preferably has a glass transition temperature of 300° C. or lower, and more preferably 250° C. or lower. The glass transition temperature is measured with a differential scanning calorimeter (DSC).

The resin (I) can be a crystalline resin or an amorphous resin without problems, but in the case of a crystalline resin, the resin preferably has a melting point of 180° C. or higher, and more preferably 190° C. or higher. A melting point within the above range enables improvement of the heat resistance of the resulting insulating layer (B). Also, the melting point of the resin (I) is preferably 380° C. or lower, and more preferably 350° C. or lower. The melting point is measured with a differential scanning calorimeter (DSC).

The resin (I) is preferably a non-fluorinated resin for its excellent abrasion resistance and excellent adhesion to the conductor (A). In particular, in order to provide excellent heat resistance to the insulated wire, the resin (I) is more preferably an engineering plastic. Any resin typically called engineering plastic is usable as the resin (I).

Also, in order to provide even better heat resistance to the insulated wire, the resin (I) is preferably at least one kind selected from the group consisting of polyimides, polyamideimides, polyetherimides, polyarylene sulfides, polyarylates, polysulfones, polyethersulfones, and liquid crystal polymers. The resin (I) is more preferably at least one kind selected from the group consisting of polyarylene sulfides, polyimides, and polyamideimides for their high continuous operating temperatures and excellent heat resistance, and is still more preferably a polyarylene sulfide for its better molding processability.

Examples of the polyimides include those obtainable by heat-treating (baking) varnish mainly containing a polyimide precursor that is obtained by polycondensation of an aromatic diamine and aromatic tetracarboxylic acid and/or an anhydride thereof. Also, a thermoplastic polyimide, which has excellent molding processability, can be used.

Examples of the polyamideimides include those obtainable by polycondensation of an aromatic dicarboxylic acid and an aromatic diisocyanate, and those obtainable by polycondensation of an aromatic dianhydride and an aromatic diisocyanate. The aromatic dicarboxylic acid can be, for example, isophthalic acid or terephthalic acid. The aromatic dianhydride can be, for example, trimellitic anhydride. The aromatic diisocyanate can be, for example, 4,4'-diphenylmethane diisocyanate, 2,4-tolylene diisocyanate, 2,6-tolylene diisocyanate, ortho-tolylene diisocyanate, or m-xylene diisocyanate.

Examples of the polyetherimides include those containing an imide bond and an ether bond in a molecule.

Examples of the polyarylene sulfides include those having a repeating unit represented by the following formula:

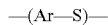

wherein Ar represents an arylene group, and S represents sulfur. The repeating unit content in the resin is preferably 70 mol % or higher.

Examples of the arylene group include p-phenylene, m-phenylene, o-phenylene, alkyl-substituted phenylene, phenyl-substituted phenylene, halogen-substituted phenylene, amino-substituted phenylene, amide-substituted phenylene, p,p'-diphenylene sulfone, p,p'-biphenylene, and p,p'-biphenylene ether.

The polyarylene sulfides can be roughly classified into resins having a crosslinked or branched structure (crosslinked type) and resins substantially without a crosslinked or branched structure (linear type). The polyarylene sulfides in the present invention can be of the crosslinked type or the linear type without problems.

Examples of the polyarylates include those obtainable by polycondensation of a dihydric phenol (e.g. bisphenol A) and an aromatic dicarboxylic acid (e.g. terephthalic acid, isophthalic acid).

Examples of the polysulfones include those obtainable by polycondensation of bisphenol A and 4,4'-dichlorodiphenylsulfone.

Examples of the polyethersulfones include those in which aromatic groups are bonded by a sulfone group or ether group.

Examples of the liquid crystal polymers include liquid crystal polyesters such as parahydroxybenzoic acid (POB)/polyethylene terephthalate (PET) copolymers, hydroxy naphthoic acid (HNA)/POB copolymers, and biphenol/benzoic acid/POB copolymers.

The fluororesin (II) is a polymer having a polymerization unit based on at least one fluoroethylenic monomer, for example. The fluororesin (II) can give a lower relative permittivity to the insulating layer (B) of the insulated wire, and excellent heat resistance and excellent abrasion resistance to the insulated wire.

The fluororesin (B) is preferably a melt-processible fluororesin. A melt-processible fluororesin gives better abrasion resistance to the insulated wire of the present invention.

Examples of the melt-processible fluororesin include tetrafluoroethylene (TFE)/hexafluoropropylene (HFP) copolymers, TFE/HFP/perfluoro(alkyl vinyl ether) (PAVE) copolymers, TFE/PAVE copolymers (PFA and MFA), ethylene (Et)/TFE copolymers, Et/TFE/HFP copolymers, polychlorotrifluoroethylene (PCTFE), chlorotrifluoroethylene (CTFE)/TFE copolymers, Et/CTFE copolymers, TFE/vinylidene fluoride (VdF) copolymers, VdF/HFP/TFE copolymers, and VdF/HFP copolymers. A low molecular weight polytetrafluoroethylene (PTFE) can also be used if it is melt-processible.

The fluororesin (II) preferably has a relative permittivity of lower than 3.0. A composition containing a fluororesin with a relative permittivity of lower than 3.0 gives a lower relative permittivity to the insulating layer (B) of the insulated wire. The fluororesin (II) more preferably has a relative permittivity of 2.8 or lower. The lower limit is not particularly limited, but is 2.0, for example.

The relative permittivity of the fluororesin (II) is a value obtained by measurement at 23° C. and a measurement frequency of 1 MHz. The measurement of the relative permittivity can be performed by the cavity perturbation method using a network analyzer.

The above-mentioned fluororesin (II) is preferably a copolymer of tetrafluoroethylene (TFE) and a perfluoroethylenic unsaturated compound represented by the following formula (1):

$$CF_2=CF-Rf^1 \quad (1)$$

wherein $Rf^1$ represents $-CF_3$ or $-ORf^2$, and $Rf^2$ represents a C1-C5 perfluoroalkyl group. The fluororesin (II) is efficiently dispersed in the resin (I), and can therefore give better physical properties, excellent insulation, and low relative permittivity to the insulating layer (B) of the insulated wire of the present invention. Furthermore, the fluororesin (II) gives more firm adhesion between the insulating layer (B) and the conductor (A). For example, if the fluororesin (II) is a non-melt-processible PTFE, the insulating layer (B) does not have sufficient physical properties and has low adhesive strength to the conductor (A).

The fluororesin (II) may be formed from single or multiple polymers.

When $Rf^1$ is $-ORf^2$, $Rf^2$ is more preferably a C1-C3 perfluoroalkyl group.

The perfluoroethylenic unsaturated compound represented by formula (1) is preferably at least one selected from the group consisting of perfluoro(alkyl vinyl ether) and hexafluoropropylene, more preferably at least one selected from the group consisting of hexafluoropropylene, perfluoro(methyl vinyl ether), perfluoro(ethyl vinyl ether), and perfluoro(propyl vinyl ether), and still more preferably at least one selected from the group consisting of hexafluoropropylene and perfluoro(propyl vinyl ether).

The fluororesin (II) is preferably formed from 80 to 99 mol % TFE and 1 to 20 mol % perfluoroethylenic unsaturated compound represented by the above-mentioned formula (1). The lower limit for the amount of TFE constituting the fluororesin (II) is more preferably 85 mol %, still more preferably 87 mol %, particularly preferably 90 mol %, and even more preferably 93 mol %. The upper limit for the amount of TFE constituting the fluororesin (II) is more preferably 97 mol %, and still more preferably 95 mol %.

The lower limit for the amount of the perfluoroethylenic unsaturated compound represented by the above-mentioned formula (1) constituting the fluororesin (II) is more preferably 3 mol %, and still more preferably 5 mol %. The upper limit for the amount of the perfluoroethylenic unsaturated compound represented by the above-mentioned formula (1) constituting the fluororesin (II) is more preferably 15 mol %, still more preferably 13 mol %, particularly preferably 10 mol %, and even more preferably 7 mol %.

The above-mentioned fluororesin (II) preferably has a melt flow rate (MFR), measured at 372° C. and with a load of 5000 g, of 0.1 to 100 g/10 min, and more preferably 10 to 40 g/10 min. An MFR within the above range gives better processability to the insulating layer (B) of the present invention, and more firm adhesion between the insulating layer (B) and the conductor (A). The lower limit for the MFR is still more preferably 12 g/10 min, and particularly preferably 15 g/10 min. In order to achieve firm adhesion between the insulating layer (B) and the conductor (A), the upper limit for the MFR is still more preferably 38 g/10 min, and particularly preferably 35 g/10 min.

The MFR of the fluororesin (II) is measured using a melt indexer in accordance with ASTM D3307-01.

Although the melting point of the fluororesin (II) is not particularly limited, the melting point is preferably equal to or lower than the melting point of the resin (I) because, in molding, the fluororesin (II) preferably has already melted at a temperature at which the resin (I) used in the molding starts to melt. For example, the melting point of the fluororesin (II) is preferably 230° C. to 350° C. The melting point of the fluororesin (II) is determined as a temperature corresponding to the maximum value on the heat of fusion curve when the temperature is increased at a rate of 10° C./min by a differential scanning calorimeter (DSC).

The fluororesin (II) may be one treated with fluorine gas or with ammonia by a known method.

The insulating layer (B) preferably has a mass ratio (I):(II) of the resin (I) to the fluororesin (II) of 98:2 to 10:90. Setting the mass ratio in the above range provides excellent insulation, excellent heat resistance, and a low relative permittivity to the insulating layer (B), and also provides more firm adhesion between the insulating layer (B) and the conductor (A).

A mass ratio of the fluororesin (II) to the resin (I) of more than 90 is likely to result in deteriorated adhesive strength between the insulating layer (B) and the conductor (A) and deteriorated abrasion resistance, while a mass ratio of lower than 2 may increase the relative permittivity. The more preferred range is from 90:10 to 15:85.

When the mass ratio of the fluororesin (II) to the resin (I) is relatively small, the matrix of the resin composition constituting the insulating layer (B) is likely to be the resin (I), while when the mass ratio of the fluororesin (II) to the resin (I) is relatively large, the matrix of the resin composition constituting the insulating layer (B) is likely to be the fluororesin (II).

The dispersion form of the resin (I) and the fluororesin (II) may be the form in which the fluororesin (II) is dispersed in the matrix of the resin (I) or may be the form in which the resin (I) is dispersed in the matrix of the fluororesin (II). Here, the dispersed particles of the resin (I) preferably have an average dispersed particle diameter of 30 μm or smaller, and more preferably 10 μm or smaller.

The insulating layer (B) contains the resin (I) and the fluororesin (II), and may contain other components if necessary. Nonlimiting examples of the other components include titanium oxide, silica, alumina, barium sulfate, calcium carbonate, aluminum hydroxide, potassium titanate, magnesium oxide, calcium oxide, clay, and talc. The insulating layer (B) may also contain components such as a filler, an adhesion imparting agent, an antioxidant, a lubricant, a processing aid, and a colorant.

The thickness of the insulating layer (B) is not limited, and can be, for example, 1 to 100 μm. The thickness of the insulating layer (B) can alternatively be 60 μm or smaller, or 40 μm or smaller. The thickness can even be reduced to 30 μm or less. Reduction in the thickness of the insulating layer (B) is advantageous in achieving excellent heat-releasing performance.

The above-mentioned insulating layer (B) can be obtained by applying a resin composition consisting of the resin (I) and the specific fluororesin (II) on the periphery of the conductor (A).

The insulated wire of the present invention can be produced by a production method including a step of preparing a resin composition containing the resin (I) and the fluororesin (II), and a step of molding the resin composition, thereby forming the insulating layer (B) on the periphery of the conductor (A).

The resin composition can be prepared by any method under the ordinary conditions, with a mixer typically used for mixing a resin composition (e.g. composition for molding), such as a mixing mill, a Banbury mixer, a pressurized kneader, and an extruder.

The above-mentioned resin composition may contain other component(s) different from the resin (I) and the fluororesin (II). The other component(s) may be pre-mixed with the resin (I) and the fluororesin (II), or may be added to the composition at the same time as the resin (I) and the fluororesin (II).

The above-mentioned resin composition can achieve an adhesive strength of 10 N/cm or higher between the insulating layer (B) obtained from the resin composition and the conductor (A). With an adhesive strength within the above range, the insulated wire is particularly suited for use as automobile electric wires and winding wires for motor coils. The adhesive strength is more preferably 15 N/cm or higher, and still more preferably 20 N/cm or higher.

The method for forming the insulating layer (B) is not particularly limited, and the conditions for the method can be the same as conventionally known. The insulating layer (B) may be formed directly on the conductor (A), or may be formed with other layer(s) (e.g. other resin layer(s)) in between.

The insulating layer (B) can be formed by, for example, a method of melt-extruding the resin composition onto the surface of the conductor (A) or onto the surface of a resin layer preliminary formed on the conductor (A), or a method of melt-extruding the resin composition into a film, cutting the film into a given size, and winding the film around the surface of the conductor (A) or the surface of a resin layer preliminary formed on the conductor (A).

In the case of forming the insulating layer (B) through melt-extrusion, it is preferred that, usually, the formation temperature is equal to or higher than the melting point of the resin (I). The formation temperature is preferably lower than the lower of the decomposition temperature of the fluororesin (II) and the decomposition temperature of the resin (I). The formation temperature may be, for example, 250° C. to 400° C. The formation temperature is preferably 280° C. to 400° C.

The insulated wire of the present invention may be heated after formation of the insulating layer (B). The heating may be performed at temperatures around the melting point of the fluororesin.

The insulated wire of the present invention includes the insulating layer (B) formed on the periphery of the conductor (A). Between the conductor (A) and the insulating layer (B), other layer(s) (e.g. other resin layer(s)) may be formed.

The material of the conductor (A) may be any material with favorable conductivity, such as copper, a copper alloy, copper-clad aluminum, aluminum, silver, gold, and galvanized iron.

The above-mentioned conductor (A) may have any shape, and may be circular or flat. When the conductor (A) is a circular conductor, the conductor (A) may have a diameter of 0.3 to 2.5 mm.

The insulated wire of the present invention is suitable as a wrapping electric wire, an electric wire for automobiles, or an electric wire for robots. Also, the insulated wire of the present invention is suitable as a winding wire (magnet wire) for coils, and is not likely to allow the coils to be damaged in the winding process. The winding wire is suitable for motors, dynamo-electric machines, compressors, and transformers, for example, and can sufficiently endure the use in miniaturized, high output motors, which require high voltage, high current, high heat conductivity, and high-density wiring process. The winding wire is also suitable as an electric wire for power distribution, power transmission, or communication.

EXAMPLES

In the following, the present invention is described based on examples. The present invention is not limited to these examples.

<Measurement of Relative Permittivity>

Each film (thickness: 25 μm) obtained from one of resin compositions in the following examples, a polyphenylene sulfide resin, and a fluororesin was cut into a strip with a width of 2 mm and a length of 100 mm. The relative permittivity at 1 MHz of the strip was measured by the cavity perturbation method (with a permittivity measuring device from Kanto Electronic Application and Development Inc., a network analyzer from Agilent Technologies).

<Measurement of Volume Specific Resistance>

The volume specific resistance of each film (thickness: 25 μm) obtained from one of resin compositions in the following examples, a polyphenylene sulfide resin, and a fluororesin was measured by the four point probe method (with Loresta HP MCP-T410 from Mitsui Chemical Corporation).

<Evaluation of Heat Resistance>

Each film (thickness: 25 μm) obtained from one of resin compositions in the following examples, a polyphenylene sulfide resin, and a fluororesin was subjected to an aging process in a 180° C. oven for 1500 hours. Then, the aged film was cut into a dumbbell-shaped piece. The tensile strength of the piece was measured, and the tensile strength decrease ratio from the tensile strength of untreated film was calculated.

<Evaluation of Abrasion Resistance>

The number of times until occurrence of abrasion was determined for each insulated wire obtained in one of the following examples and comparative examples using an electric wire-coating abrasion tester (scrape tester from Toyo Seiki Kogyo Co., Ltd.) in accordance with JIS-C3003 with a load of 300 g.

In the examples and comparative examples, the following materials were used.

Resin (I): Polyphenylene sulfide (trade name: "FORTRON 0220A" from Polyplastics Co., Ltd., relative permittivity: 3.6)

Resin (I): Polyamideimide (trade name: "Torlon TI-5013" by Toray Industries, Inc., relative permittivity: 3.8)

Fluororesin (II): Tetrafluoroethylene/hexafluoropropylene copolymer (composition weight ratio: tetrafluoroethylene/hexafluoropropylene/perfluoro(propyl vinyl ether)=87.5/11.5/1.0, relative permittivity: 2.1)

Examples 1 to 7

The resin (I) and the fluororesin (II) were pre-mixed at a ratio (parts by mass) shown in Table 1. The pre-mixture was melt-kneaded by a twin-screw extruder (φ30 mm, L/D=35) at a cylinder temperature of 330° C. and a screw rotation speed of 200 rpm, whereby resin composition pellets were produced.

The obtained resin composition pellets were supplied to an electric wire formation device with a screw outer diameter of φ30 mm. Thereby, a coated electric wire with a coating thickness of 0.1 mm was produced which had a copper strand with an outer diameter of φ10 mm as the core wire. The obtained coated electric wire was subjected to evaluation of heat resistance, evaluation of abrasion resistance, measurement of relative permittivity, and measurement of volume specific resistance. The results are shown in Table 1.

Comparative Examples 1 to 3

Pellets of the resin (I) or the fluororesin (II) were charged into the electric wire forming device with a screw outer diameter of φ30 mm, so that a coated electric wire having a coating thickness of 0.1 mm was produced which had a copper strand with an outer diameter of φ1.0 mm as the core wire. The obtained coated electric wire was subjected to evaluation of heat resistance, evaluation of abrasion resistance, measurement of relative permittivity, and measurement of volume specific resistance. The results are shown in Table 1.

TABLE 1

|  | Example 1 | Example 2 | Example 3 | Example 4 | Example 5 | Example 6 | Example 7 | Comparative Example 1 | Comparative Example 2 | Comparative Example 3 |
|---|---|---|---|---|---|---|---|---|---|---|
| Resin (I) Polyphenylene sulfide | 80 | 60 | 30 | 20 |  |  |  | 100 |  |  |
| Resin (I) Polyamideimide |  |  |  |  | 80 | 60 | 30 |  | 100 |  |
| Fluororesin (II) | 20 | 40 | 70 | 80 | 20 | 40 | 70 |  |  | 100 |
| Heat resistance (%) | <1 | <1 | <1 | <1 | <1 | <1 | <1 | <1 | <1 | <1 |
| Abrasion resistance (times) | >2000 | 1300 | 280 | 105 | >2000 | 1480 | 360 | >2000 | >2000 | <50 |
| Relative permittivity 1 MHz | 3.3 | 3.0 | 2.5 | 2.4 | 3.5 | 3.2 | 7 | 3.6 | 3.8 | 2.1 |
| Volume specific resistance | $10^{16}$ | $10^{16}$ | $10^{17}$ | $10^{17}$ | $10^{14}$ | $10^{15}$ | $10^{16}$ | $10^{16}$ | $10^{14}$ | $10^{17}$ |

INDUSTRIAL APPLICABILITY

The insulated wire of the present invention includes an insulating layer with a low relative permittivity, and has excellent heat resistance and excellent abrasion resistance. Accordingly, the insulated wire is suitable as a wrapping electric wire, an electric wire for automobiles, or an electric wire for robots, for example. Also, the insulated wire of the present invention is suitable as a winding wire (magnet wire) for coils because the insulated wire is not likely to allow the coils to be damaged in the winding process. In particular, the insulated wire is suitable for motors, dynamo-electric machines, compressors, and transformers, for example.

The invention claimed is:

1. An insulated wire comprising
   a conductor (A), and
   an insulating layer (B) formed on the periphery of the conductor (A),
   the insulating layer (B) is formed from a resin composition that contains a resin (I) with a relative permittivity of 3.0 to 4.0 and a fluororesin (II),
   wherein the resin (I) is a polyarylene sulfide,
   wherein the insulating layer (B) has a mass ratio (I):(II) of the resin (I) to the fluororesin (II) of 30:70 to 15:85,
   wherein the fluororesin (II) is a copolymer of tetrafluoroethylene and a perfluoroethylenic unsaturated compound represented by the following formula (1):

$$CF_2=CF-Rf^1 \quad (1)$$

wherein $Rf^1$ represents $-CF_3$ or $-ORf^2$, and $Rf^2$ represents a C1-C5 perfluoroalkyl group, and
   wherein the fluororesin (II) is formed from 80 to 99 mol % tetrafluoroethylene and 1 to 20 mol % perfluoroethylenic unsaturated compound represented by the formula (1).

2. The insulated wire according to claim 1,
   wherein the fluororesin (II) is a copolymer of tetrafluoroethylene and at least one perfluoro monomer selected from the group consisting of perfluoro(alkyl vinyl ethers) and hexafluoropropyl ene.

3. The insulated wire according to claim 1,
   wherein the fluororesin (II) is a copolymer of tetrafluoroethylene and perfluoro (alkyl vinyl ethers).

* * * * *